(12) United States Patent
Mercer

(10) Patent No.: US 12,057,772 B2
(45) Date of Patent: Aug. 6, 2024

(54) MULTIPATH HYBRID REGULATOR

(71) Applicant: Dialog Semiconductor (UK) Limited, London (GB)

(72) Inventor: Mark Mercer, Phoenix, AZ (US)

(73) Assignee: Dialog Semiconductor (UK) Limited, London (GB)

( * ) Notice: Subject to any disclaimer, the term of this patent is extended or adjusted under 35 U.S.C. 154(b) by 237 days.

(21) Appl. No.: 17/501,151

(22) Filed: Oct. 14, 2021

(65) Prior Publication Data

US 2023/0122225 A1    Apr. 20, 2023

(51) Int. Cl.
*H02M 3/07* (2006.01)

(52) U.S. Cl.
CPC ..................................... *H02M 3/07* (2013.01)

(58) Field of Classification Search
CPC ......... H02M 3/155–156; H02M 3/145; H02M 3/158; H02M 3/1582–1588; H02M 2001/4283; H02M 2001/4291; H02M 2003/1552; H02M 1/12; H02M 1/42; H02M 1/4225; H02M 1/4233; H02M 1/4241; H02M 1/4258; H02M 1/425; H02M 1/4208
See application file for complete search history.

(56) References Cited

U.S. PATENT DOCUMENTS

| 10,298,124 B2 | 5/2019 | Petersen et al. | |
| 10,756,623 B1 * | 8/2020 | Petersen | H02M 1/088 |
| 10,790,742 B1 | 9/2020 | Petersen | |

FOREIGN PATENT DOCUMENTS

DE    10 2016 225 795 A1    6/2018

OTHER PUBLICATIONS

German Office Action, File No. 10 2021 133 135.8, Applicant: Dialog Semiconductor (UK) Limited, Mail date: May 2, 2022, 7 pages.
"48V-to-12V Dual-Path Hybrid DC-DC Converter," by Katsuhiro Hata et al., 2020 IEEE Applied Power Electronics Conference and Exposition (APEC), Mar. 15-19, 2020, pp. 2279-2284.
"A Hybrid Structure Dual-Path Step-Down Converter With 96.2% Peak Efficiency Using 250-mΩ Large-DCR Inductor," by Yeunhee Huh et al., IEEE Journal of Solid-State Circuits, vol. 54, No. 4, Apr. 2019, pp. 959-967.
"Zero Inductor Voltage Multilevel Bus Converter," by Samuel Webb et al., 2018 IEEE Applied Power Electronics Conference and Exposition (APEC), Mar. 4-8, 2018, pp. 2175-2182.
"A Resonant Switched Capacitor Based 4-to-1 Bus Converter Achieving 2180 W/in3 Power Density and 98.9% Peak Efficiency," 2018 IEEE Applied Power Electronics Conference and Exposition (APEC), Mar. 4-8, 2018, pp. 121-126.

* cited by examiner

*Primary Examiner* — Bryan R Perez
(74) *Attorney, Agent, or Firm* — Saile Ackerman LLC; Stephen B. Ackerman

(57) ABSTRACT

The present document describes a power converter configured to convert electrical power at an input voltage at an input of the power converter to electrical power at an output voltage at an output of the power converter. The power converter comprises a first flying capacitor, a second flying capacitor and a third flying capacitor, as well as an inductor and a set of power switches. Furthermore, the power converter comprises a control unit configured to control the set of power switches such that during an operation cycle the power converter is operated in a first state and in a second state in a mutually exclusive manner.

15 Claims, 9 Drawing Sheets

MULTIPATH HYBRID REGULATOR

TECHNICAL FIELD

The present document relates to a DC-DC power converter, in particular to a voltage regulator which is optimized for a 4-to-1-conversion ratio.

BACKGROUND

For many years, the intermediate bus architecture (IBA) has been widely used in data centers and telecommunications systems to step-down the 48V backplane to a 12V bus (4-to-1 conversion ratio). The 4-to-1 conversion ratio may also be used in charger applications, e.g., for converting an input voltage VIN=16V to an output voltage VOUT=4V.

A way to improve efficiency of a Switched Mode Power Supply (SMPS), which comprises a voltage regulator, is to lower the power loss associated with the inductor. This may be achieved by lowering the current ripple and/or the average current. For a single-phase, 2-level, step-down SMPS, the average inductor current is equal to the load current. The ripple current is a function of the conversion ratio (CR) and is minimized (or "nulled") when CR=0 or 1. "Nulling" means that the voltage across the inductor is so small that the inductor current becomes non-linear. Non-linear inductor current is a characteristic of resonant or quasi-resonant operation. Multilevel Converters (MLCs) provide inductor ripple nulls at additional values of CR. For example, a 3-level converter (3LC) has an additional ripple current null at CR=0.5. In other words, the 3LC essentially operates in resonant or quasi-resonant mode when CR=0.5. A 4-level converter (4LC) has inductor ripple nulls at CR=0.33 and 0.67.

SUMMARY

The present document is directed at the technical problem of providing a power converter, in particular a voltage regulator, which allows for an accurate voltage regulation over a wide operating range, i.e., over a wide range of CR, and which is particularly power efficient at a 4-to-1 conversion ratio.

According to an aspect, a power converter, in particular a voltage regulator, configured to convert electrical power at an (DC) input voltage at an input of the power converter to electrical power at an (DC) output voltage at an output of the power converter. The power converter comprises a first flying capacitor, a second flying capacitor and a third flying capacitor. Furthermore, the power converter comprises an inductor and a set of power switches (e.g., MOSFETs).

In addition, the power converter comprises a control unit configured to control the set of power switches such that during an operation cycle the power converter is operated in a first state and in a second state. The power converter exhibits within the first state a first current path from ground through the second flying capacitor, through the first flying capacitor and through the inductor to the output, and a second current path from the input through the third flying capacitor to the output (without passing through the inductor). The power converter exhibits within the second state a first current path from ground through the third flying capacitor, through the second flying capacitor and through the inductor to the output, and a second current path from ground through the first flying capacitor to the output (without passing through the inductor).

According to a further aspect a corresponding method for operating a power converter is described.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner

BRIEF DESCRIPTION OF THE DRAWINGS

The invention is explained below in an exemplary manner with reference to the accompanying drawings, wherein.

DESCRIPTION

As indicated above, the present document is directed at providing a voltage regulator which is particularly efficient at a conversion ratio of 4-to-1.

Figure 1A:
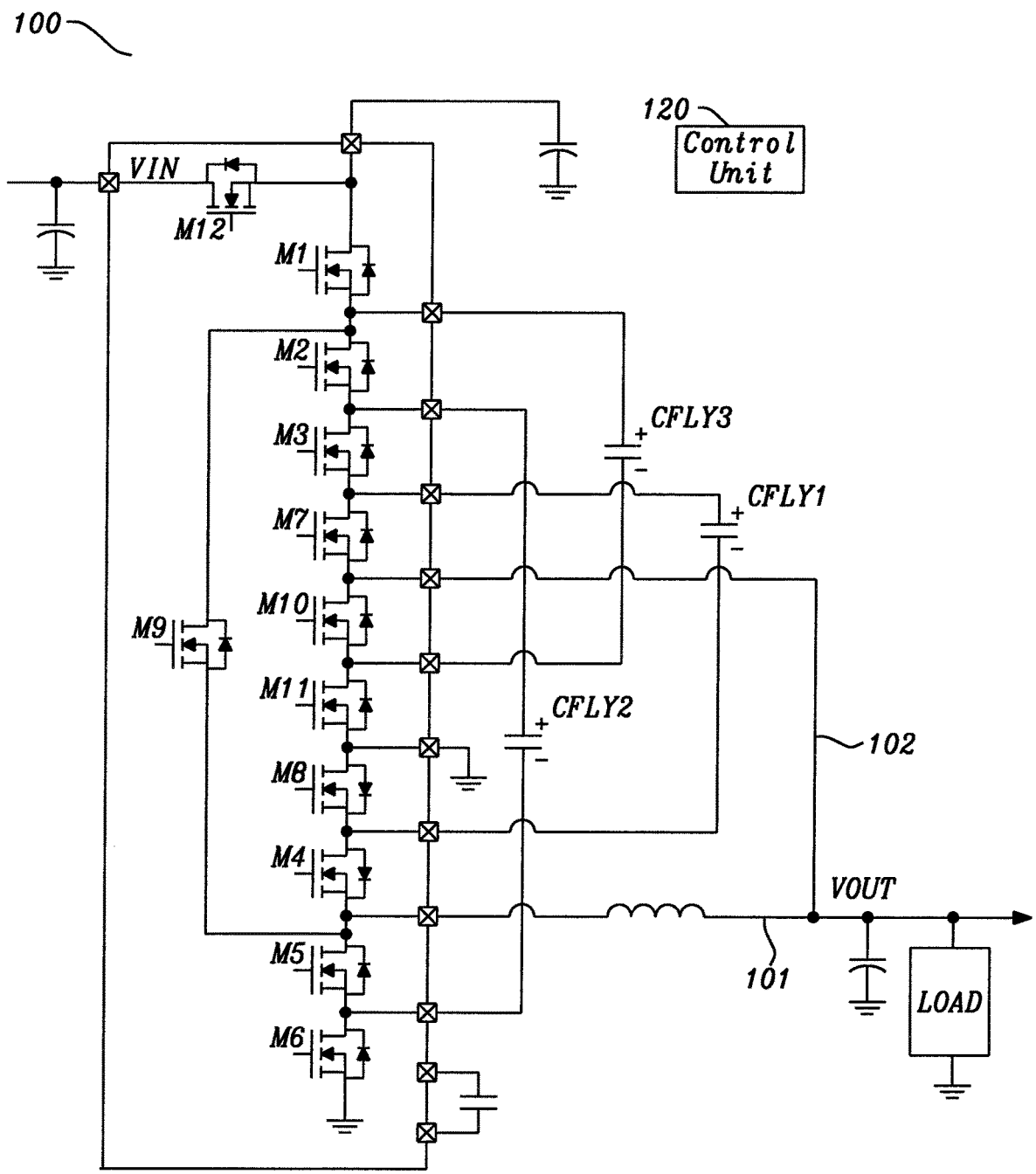
FIG. 1A illustrates an example voltage regulator.

FIG. 1A shows the topology of an example voltage regulator 100, which comprises eleven power switches, M1-M11, and an optional $12^{th}$ power switch, M12, which may be used for over-voltage protection in a multi-phase application. In FIG. 1a the power switches are represented as NMOS (n-type metaloxide semiconductor) switches. It should be noted that other types of switches may be used such as PMOS, bipolar transistors, and/or mechanical switches (e.g., relays).

The switches M1, M2, M3, M7, M10, M11 may be arranged in series between the input voltage VIN and ground (GND). The switch M9 may be arranged between the node which directly couples M1 with M2 and the node which directly couples M4 and M5. In the present document, the node between two directly adjacent power switches Mx and My is referred to as node Mx/My.

The voltage regulator 100 comprises a first current path 101 and a second current path 102 for providing current to the load at the output of the voltage regulator 100. The first current path 101 comprises an inductor 105, and may be used for regulating the output voltage VOUT. The second current path 102 bypasses the inductor 105, thereby lowering the current through the inductor 105.

Furthermore, the voltage regulator 100 comprises a first flying capacitor CFLY1 between the node M3/M7 and the node M8/M4. In addition, the voltage regulator 100 comprises a second flying capacitor CFLY2 between the node M2/M3 and the node M5/M6. In addition, the voltage regulator 100 comprises a third flying capacitor CFLY3 between the node M1/M2 and the node M10/M11.

Hence, a single inductor 105, dual output path hybrid step-down regulator 100 with optimized efficiency for 4-to-1 conversion is described. The regulator 100 comprises an inductor-based hybrid converter (for the first current path 101) and a charge pump converter (for the second current path 102), which may also be referred to as a switch capacitor converter. The charge pump (on the second current path 102) supplements the inductor current (on the first current path 101) to deliver the required energy to the load. The hybrid dual path topology reduces the ripple current and the average current of the inductor 105, thereby lowering the core loss and the DCR (direct current resistance) loss. The reduced current levels allow for the use of a smaller inductor 105 and for a reduced PCB (printed circuit board) footprint. The regulator 100 operates over a relatively wide range of operating conditions, in particular a relatively wide range of CRs. The regulated output voltage VOUT can range from close to 0V to near VIN.

Figure 1B:
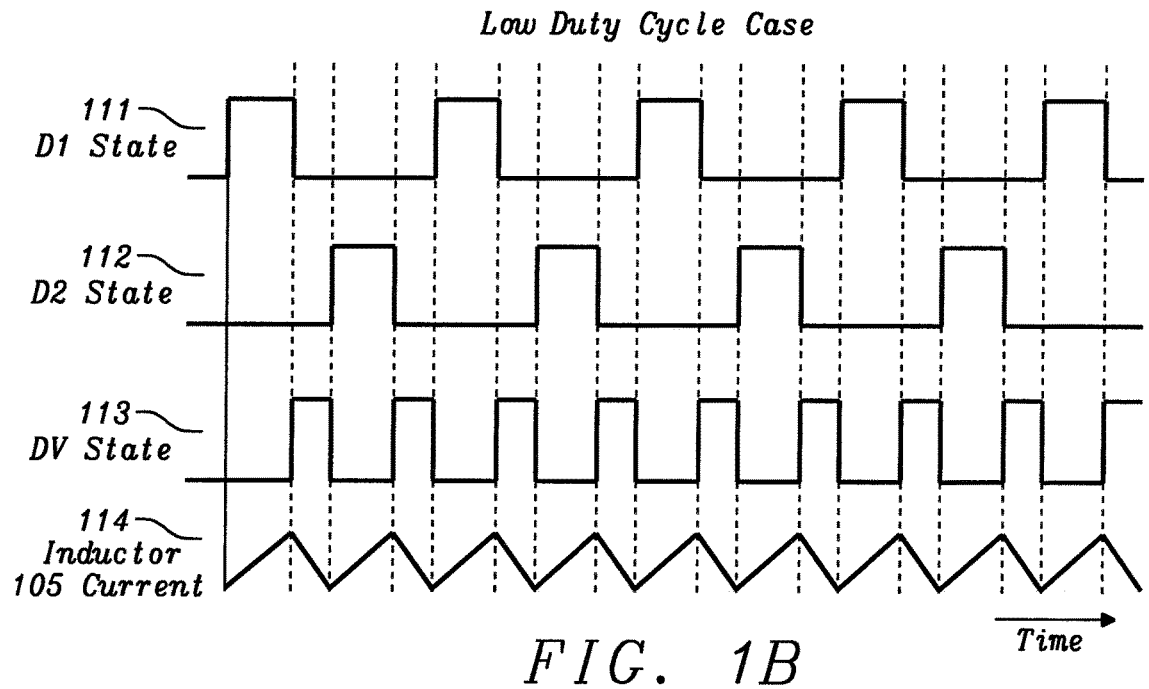
FIG. 1B shows PWM pulses for different phases or states of the voltage regulator of FIG. 1A (in case of a relatively low duty cycle)
Figure 1C:
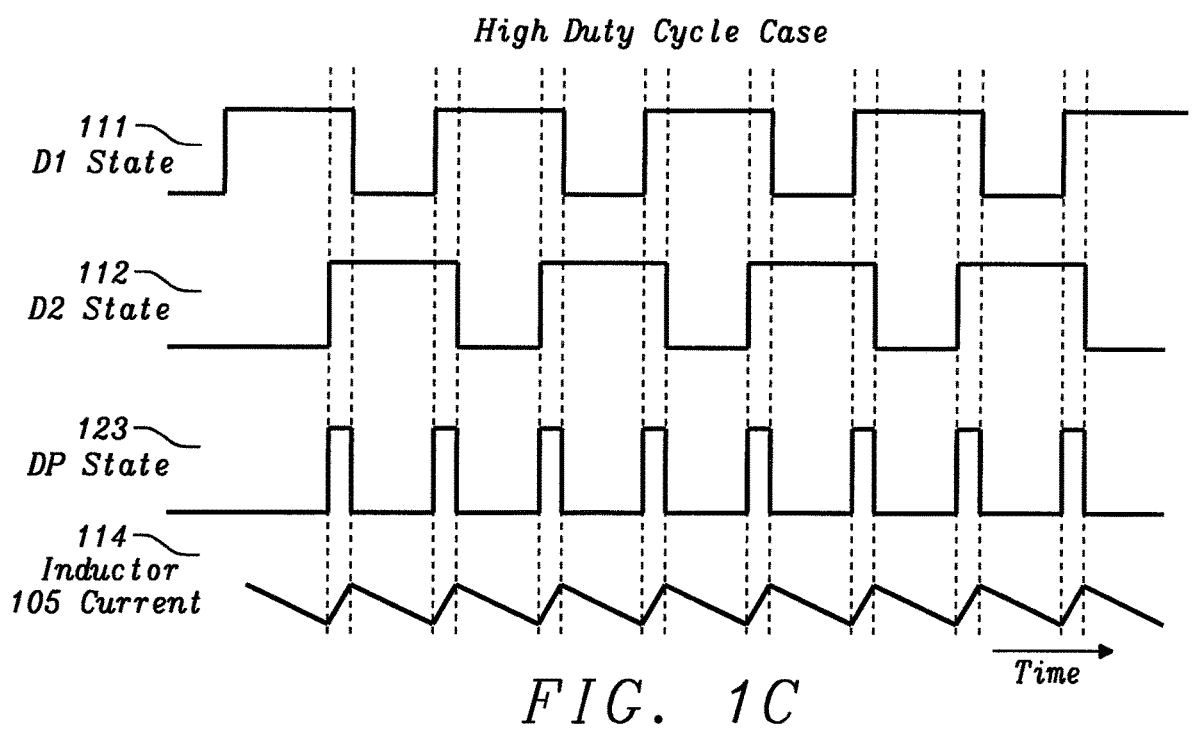
FIG. 1C shows PWM pulses for different phases of the voltage regulator of FIG. 1A (in case of a relatively high duty cycle)

Control of the voltage regulator 100 may be based on a dual ramp PWM (pulse width modulation) scheme that produces two PWM pulses of equal duration. The duty cycle of the pulses with respect to the switching period (also referred to as an operation cycle) may be designated as a first phase or state D1 and as a second phase or state D2. The states D1 and D2 may be generated using PWM ramps and/or using a digital controller. In FIG. 1$b$ a low duty cycle situation is illustrated, where the first state D1 111 and the second state D1 112 do not overlap. The intervening interval may be designated as a first intermediate state DV 113. In FIG. 1$c$ a high duty cycle situation is illustrated, where the first state D1 111 and the second state D1 112 overlap. The overlap interval may be designated as a second intermediate state DP 123. In addition, FIGS. 1$b$ and 1$c$ illustrate the current 114 through the inductor 105. It should be noted that in FIG. 1$b$, the periods, where the PWM signals 111, 112 are high may be used as duty cycles for D1 and D2, respectively. On the other hand, in FIG. 1$c$, the periods, where the PWM signals 111, 112 are low may be used as duty cycles for D1 and D2, respectively.

For relatively low conversion ratios (CR=VOUT/VIN) between 0 and 0.5, there are four switch states or phases 111, 112, 113, 123 which may be used to create a complete switching or operation cycle. These states or phases may be designated as D1 111, D2 112, DV 113 and DP 123. The different switch states or phases are illustrated in FIGS. 2A to 2D. The dotted traces correspond to the inductor current path 101 (which is also referred to as the first current path) towards the load. The dashed traces correspond to the bypass current path 102 (which is also referred to as the second current path) with current that flows from the input to the output through one or more of the charge pump capacitors CFLY1, CFLY2, CFLY3 (without passing through the inductor 105). The voltages for the flying capacitors CFLY1 and CFLY3 may be maintained at VOUT and VIN−VOUT, respectively, by the commutation action of the charge pump stage. The voltage for the flying capacitor CFLY2 may be internally controlled to be equal to VIN−2*VOUT, with a minimum value being equal to VOUT (e.g., using the voltage control circuit 400 which is described in the present document).

Figure 2A:
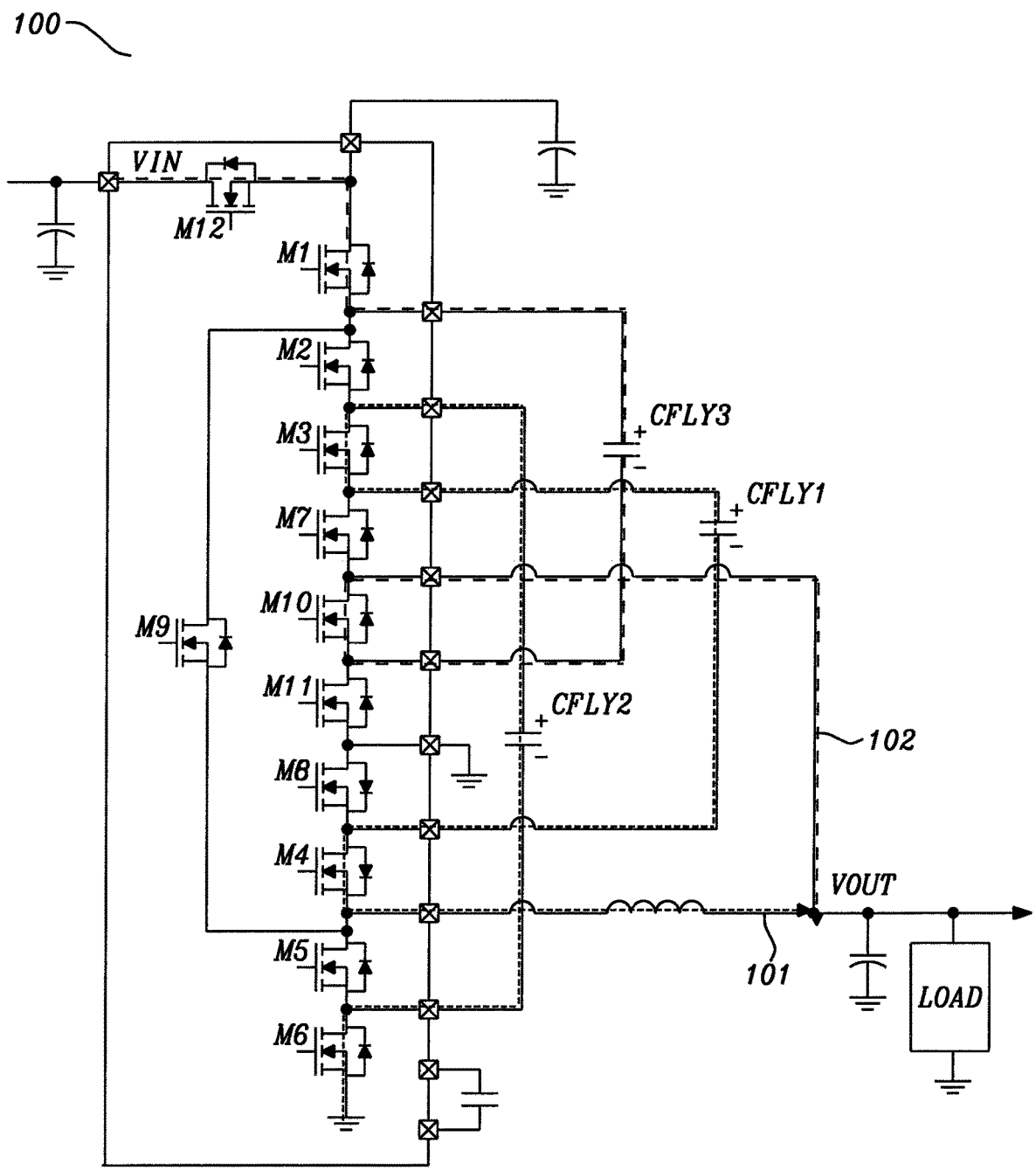
FIG. 2A illustrates the dual current paths of a first state (referred to herein as D1)

FIG. 2A illustrates the first current path 101 (dotted line) and the second current path 102 (dashed line) for the first state D1 111. In the first state D1 111, the optional switch M12 is closed. Furthermore, the switches M1, M3, M10, M4, M6 are closed. On the other hand, the switches M2, M7, M11, M8, M5 are open. Furthermore, M9 is open. The first current path 101 (dotted line) couples the output, via the inductor 105, via M4, via CFLY1, via M3, via M6 to ground. The second current path 102 (dashed line) couples the output, via M10, via CFLY3 and via M1 to the input.

It should be noted that the components which are listed to be on a current path 101, 102 may be the only components which are on the current path 101, 102. Furthermore, the different components on a current path 101, 102 may be located on the current path 101, 102 in the given order.

During a D1 state 111 (for low CR operation), the external energy storage elements may change as follows:
 The inductor 105 is magnetized if the duty cycle D1≤0.5;
 The inductor 105 is demagnetized if the duty cycle 0.75≥D1≥0.5;
 The second flying capacitor CFLY2 is discharged; and/or
 The first flying capacitor CFLY1 and the second flying capacitor CLFY3 are charged.

Figure 2B:
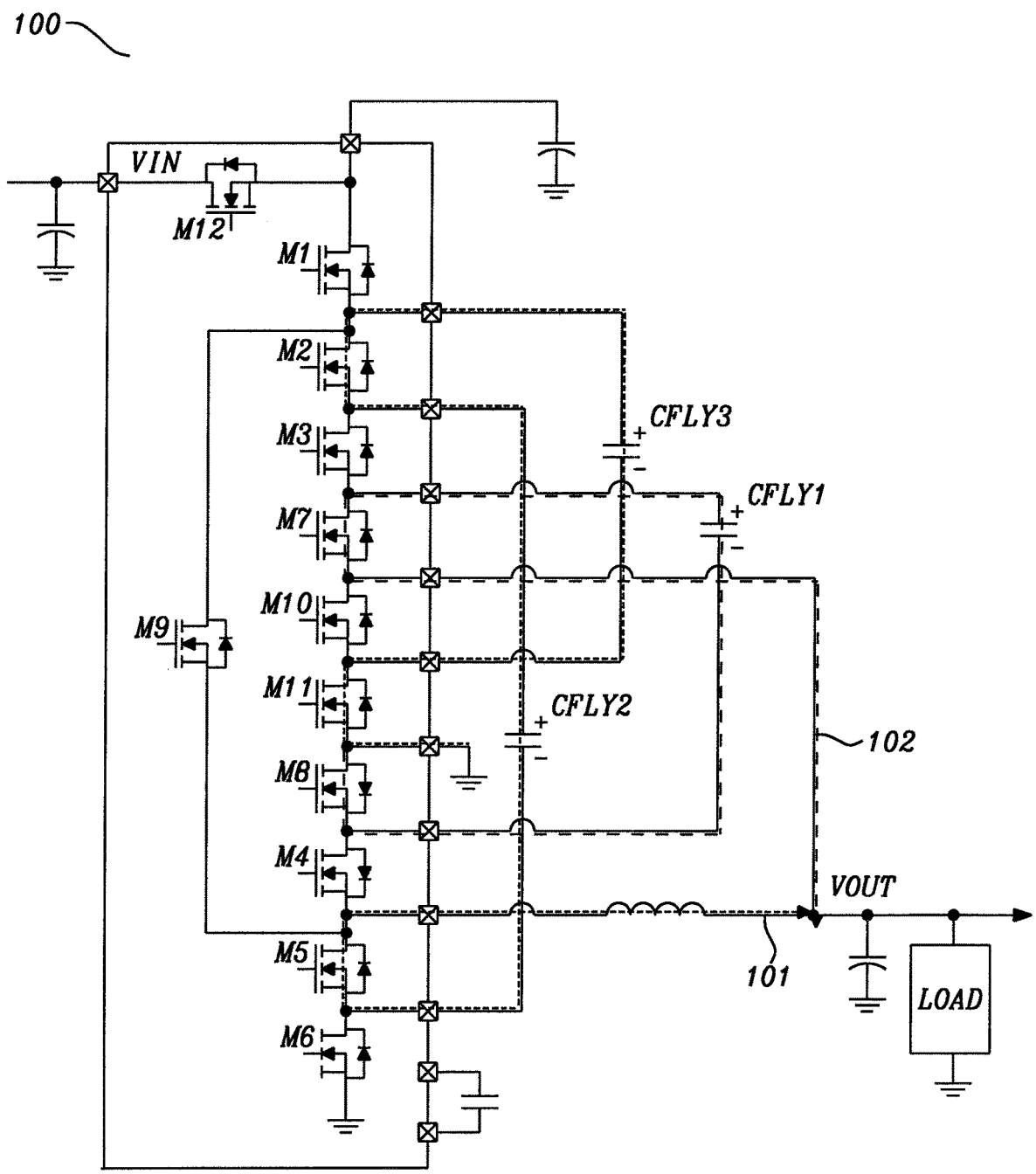
FIG. 2B illustrates the dual current paths of a second state (referred to herein as D2)

FIG. 2B illustrates the first current path 101 (dotted line) and the second current path 102 (dashed line) for the second state D2 112. In the second state D2 112, the optional switch M12 may be open or closed. Furthermore, the switches M2, M7, M11, M8, M5 are closed. On the other hand, the switches M1, M3, M10, M4, M6 are open. Furthermore, M9 is open. Hence, the switching state of the switches M1 to M11 (without M9) in the second state D2 112 may be opposite to the switching state of the switches M1 to M11 (without M9) in the first state D1 111. The first current path 101 (dotted line) couples the output, via the inductor 105, via M5, via CFLY2, via M2, via CFLY3, via M11 to ground. The second current path 102 (dashed line) couples the output, via M7, via CFLY1 and via M8 to ground.

During a D2 state 112 (for low CR operation), the external energy storage elements may change as follows:
 The inductor 105 remains substantially neutral (and is substantially neither magnetized nor demagnetized) if the duty cycle D1≤0.6;
 The inductor 105 is demagnetized if the duty cycle 0.75≥D1≥0.6;
 The second flying capacitor CFLY2 is charged; and/or
 The first flying capacitor CFLY1 and the third flying capacitor CLFY3 are discharged.

Figure 2C:
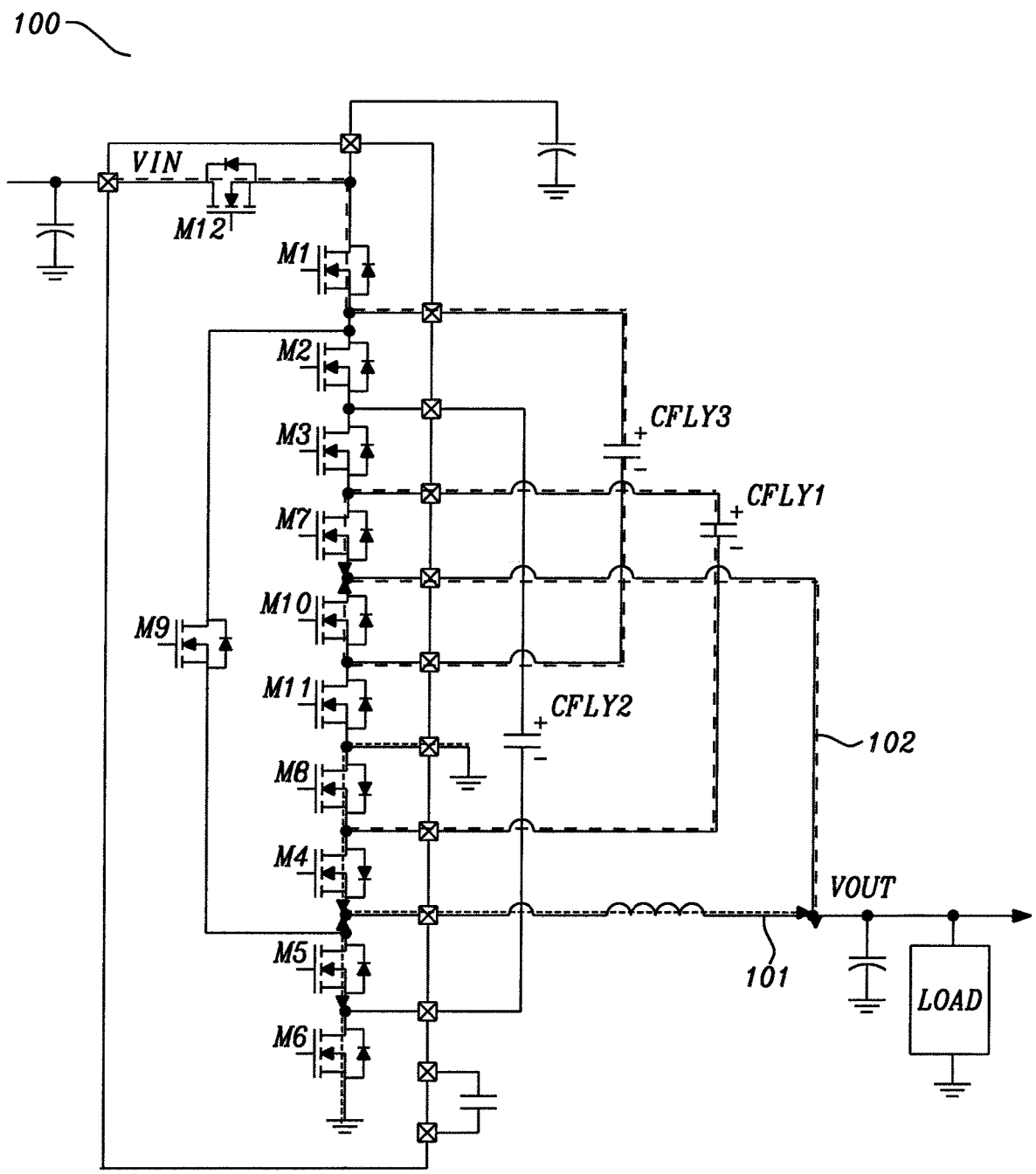
FIG. 2C illustrates the dual current paths of a first intermediate state (referred to herein as DV)

FIG. 2C illustrates the first current path 101 (dotted line) and the second current path 102 (dashed line) for the intermediate state DV 113. In the intermediate state DV 113, the optional switch M12 is closed. Furthermore, the switches M1, M10, M7, M8, M4, M5, M6 are closed. On the other hand, the switches M2, M3, M11 are open. Furthermore, M9 is open. The first current path 101 (dotted line) couples the output, via the inductor 105, via M4, via M8 to ground and/or the inductor 105, via M5, via M6 to ground. The second current path 102 (dashed line) couples the output, via M10, via CFLY3 and via M1 to the input. Furthermore, the second current path 102 (dashed line) couples the output via M7, via CLFY1, via M8 to ground.

During a DV state 113, the external energy storage elements may change as follows:
   The inductor 105 is demagnetized;
   The second flying capacitor CFLY2 is coupled to an internal circuit to adjust its voltage as needed (as discussed later);
   The first flying capacitor CFLY1 is coupled between VOUT and ground (GND); and/or
   The third flying capacitor CFLY3 is coupled between VIN and VOUT.

Figure 2D:
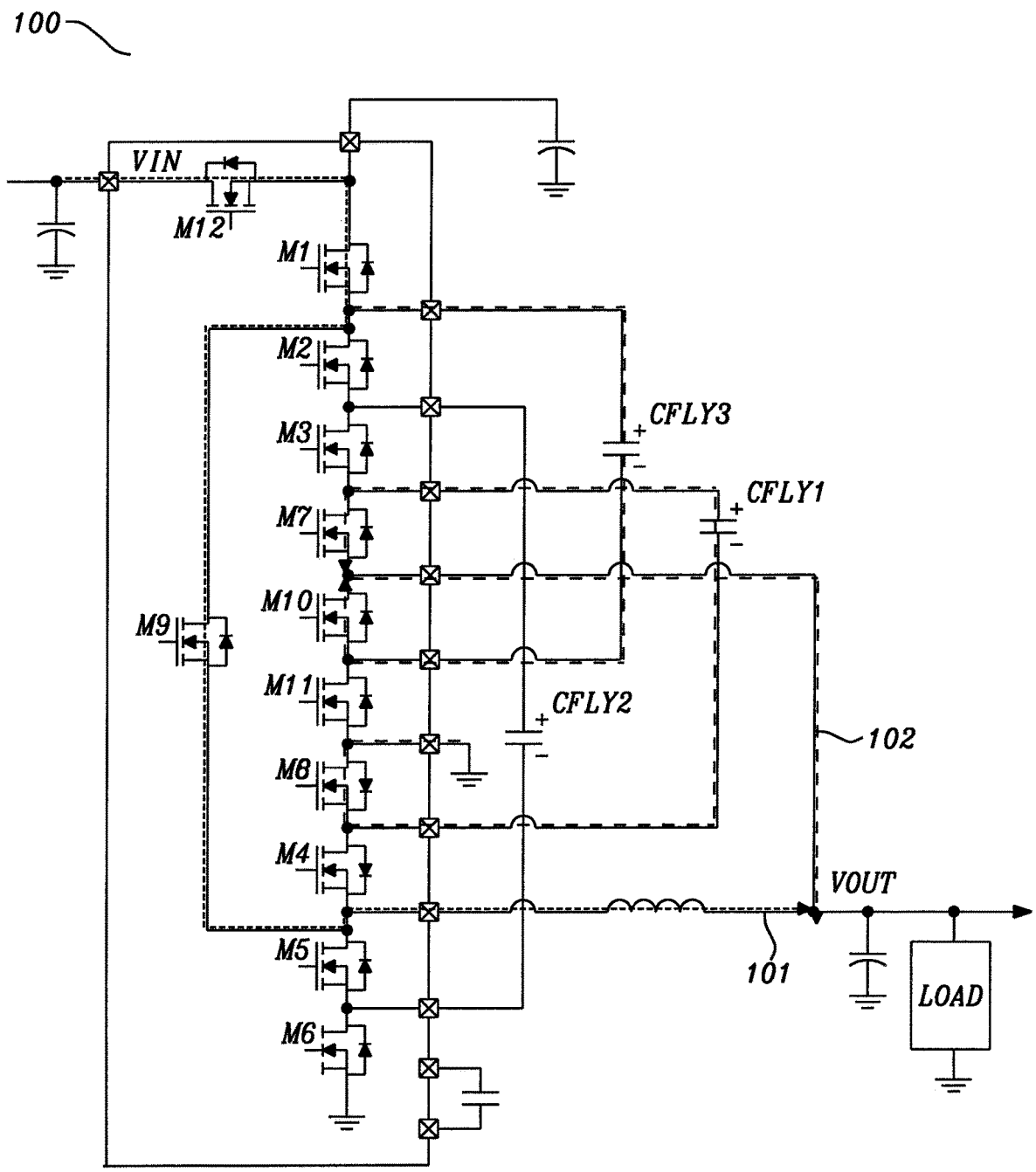
FIG. 2D illustrates the dual current paths of a second intermediate state (referred to herein as DP)

FIG. 2D illustrates the first current path 101 (dotted line) and the second current path 102 (dashed line) for the intermediate state DP 123. In the intermediate state DP 123, the optional switch M12 is closed. Furthermore, the switches M1, M7, M10, M8, M6 are closed. On the other hand, the switches M2, M3, M11, M4, M5 are open. Furthermore, M9 is closed. The first current path 101 (dotted line) couples the output, via the inductor 105, via M9, via M1 to the input. The second current path 102 (dashed line) couples the output, via M10, via CFLY3 and via M1 to the input, and via M7, via CFLY1, via M8 to ground.

During a DP state 123, the external energy storage elements may change as follows:
   The inductor 150 is magnetized;
   The second flying capacitor CFLY2 is coupled to an internal circuit to adjust its voltage as needed (discussed later);
   The first flying capacitor CFLY1 is coupled between VOUT and GND; and/or
   The third flying capacitor CFLY3 is coupled between VIN and VOUT.

The switching pattern for low CR operation may be D1→DV→D2→DV→D1→ . . . , or D1→DP→D2→DP→D1→ . . . . The duration of D1 may be determined by a PWM modulator (e.g., analog or digital). The duration of D2 may be equal to the duration of D1. The duration of DV or DP may be dependent on the duration of D1 relative to $T_{SW}/2$, where $T_{SW}$ is the interval or duration of one complete switching or operation cycle. The A-sec balance for all flying capacitors and the V-sec balance for the inductor 105 is typically maintained by the above-mentioned switching cycle.

Figure 3A:
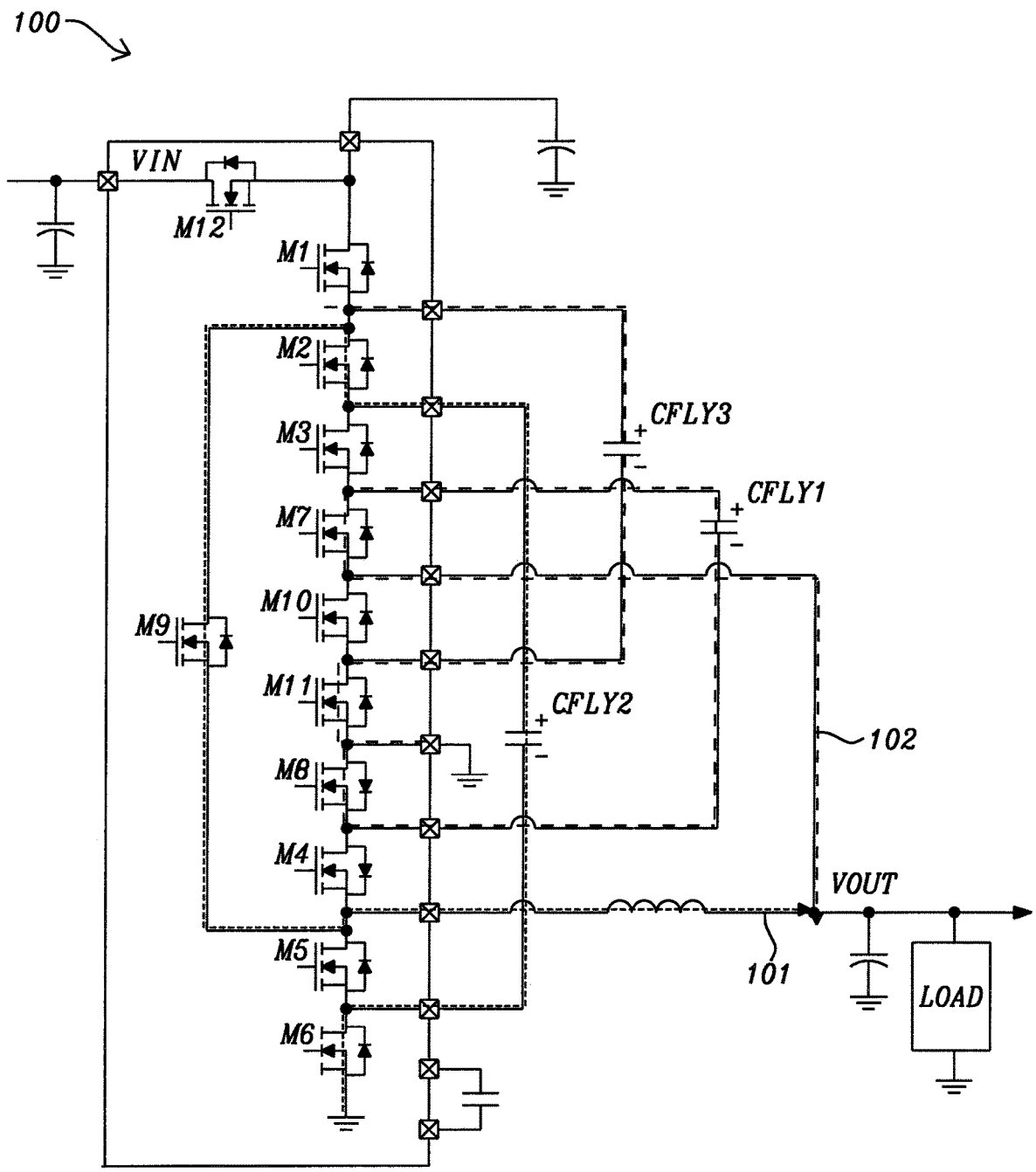
FIG. 3A illustrates the dual current paths of a first state (referred to herein as $D1_{3LC}$) for relatively high conversion ratios.
Figure 3B:
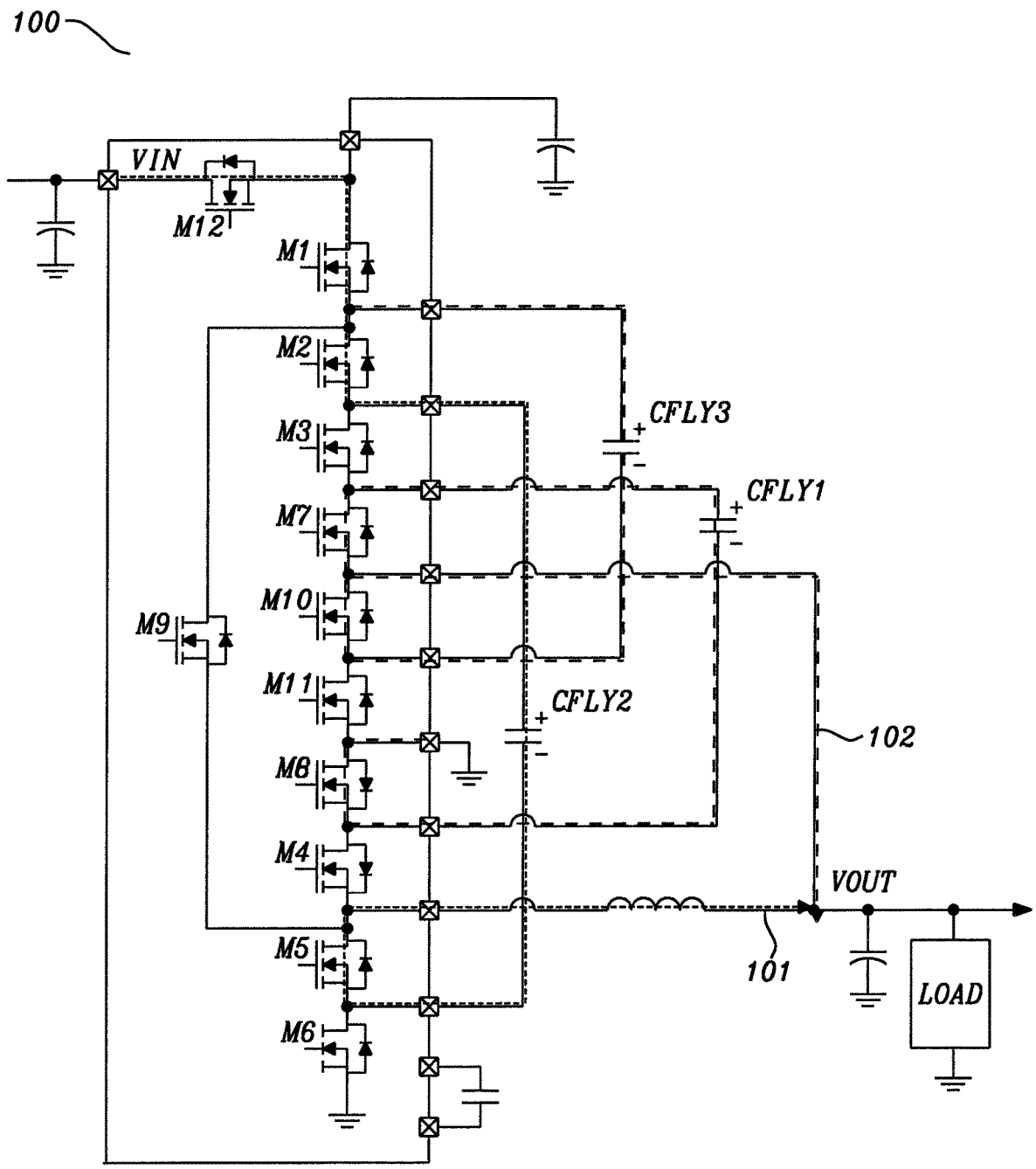
FIG. 3B illustrates the dual current paths of a second state (referred to herein as $D2_{3LC}$) for relatively high conversion ratios.

For high conversion ratio operation, where 1≥CR≥0.5, the regulator 100 undergoes a mode transition and operates as a 3-level converter. The D1 and D2 switch states are replaced by $D1_{3LC}$ and $D2_{3LC}$ (which are illustrated in FIGS. 3A and 3B, respectively). When transitioning from the low CR operation to the high CR operation, the controller for the converter 100 may make a step change in the duty cycle from 75% to 50%.

FIG. 3A illustrates the first current path 101 (dotted line) and the second current path 102 (dashed line) for the modified first state $D1_{3LC}$ 111. In the first state $D1_{3LC}$ 111, the optional switch M12 may be open or closed. Furthermore, the switches M2, M7, M11, M8, M6 are closed. On the other hand, the switches M1, M3, M10, M4, M5 are open. Furthermore, M9 is closed. The first current path 101 (dotted line) couples the output, via the inductor 105, via M9, via M2, via CFLY2, via M6 to ground. The second current path 102 (dashed line) couples the output, via M7, via CFLY1 and via M8 to ground. Furthermore, CFLY3 is arranged in parallel to CFLY2.

During a $D1_{3-LC}$ state (for high CR operation), the external energy storage elements may change as follows:
   The inductor 105 is demagnetized;
   The second flying capacitor CFLY2 is discharged;
   The first flying capacitor CFLY1 is connected in parallel with the output capacitor COUT at the output of the regulator 100; and/or
   The third flying capacitor CLFY3 is connected in parallel with the second flying capacitor CFLY2.

FIG. 3B illustrates the first current path 101 (dotted line) and the second current path 102 (dashed line) for the modified second state $D2_{3LC}$ 112. In the second state $D2_{3LC}$ 112, the optional switch M12 is closed. Furthermore, the switches M1, M2, M7, M10, M8, M5 are closed. On the other hand, the switches M3, M11, M4, M6 are open. Furthermore, M9 is open. The first current path 101 (dotted line) couples the output, via the inductor 105, via M5, via CFLY2, via M2, via M1 to the input. The second current path 102 (dashed line) couples the output, via M7, via CFLY1, via M8 to ground. Furthermore, CFLY3 is arranged between the input and the output via the M10 and M1.

During a $D2_{3LC}$ state (for high CR operation), the external energy storage elements may change as follows:
   The inductor 105 is demagnetized;
   The second flying capacitor CFLY2 is charged;
   The first flying capacitor CFLY1 is connected in parallel with COUT; and/or
   The third flying capacitor CLFY3 is connected between the input and the output.

As can be seen in FIGS. 3A and 3B, the flying capacitors CFLY1 and CFLY3 do not commutate during 3-level operation. They remain static, and only CFLY2 commutates. The switching pattern for relatively high CR may be $D1_{3LC}$→DP→$D2_{3LC}$→DP→$D1_{3LC}$→ • • • . The voltages of the flying capacitors CFLY1 and CFLY3 are maintained at the same level as for low CR operation. The voltage for CFLY2 may be maintained to be equal VIN−VOUT. This is accomplished by the fact that CFLY2 is coupled in parallel with CFLY3 during the $D1_{3LC}$ state. It should also be noted that the CFLY2 voltage at 75% duty cycle for low CR operation is the same as at 50% duty cycle for high CR operation (which is also referred to herein as the 3LC mode). This means that CFLY2 typically does not undergoes a voltage change during a mode change from low CR operation to high CR operation.

In order to avoid inadvertent body diode conduction during 3-LC operation, switches M2 and M3 should be replaced by back-to-back switches M2a/b and M3a/b, respectively. Table 1 shows different operation modes of the power converter 100. The DV modes comprise the states D1, D2 and DV. The DP1 and DP2 modes comprise the states D1, D2 and DP. The 3-LC mode comprises the states $D1_{3LC}$, $D2_{3LC}$ and DP. It should be noted that the duty cycle of D1 is equal to the duty cycle of D2.

TABLE 1

| mode | DI range | CR | V(CFLY1) | V(CFLY2) | V(CFLY3) |
|---|---|---|---|---|---|
| DV | 0.5 ≥ D1 ≥ 0 | 0.25 ≥ CR ≥ 0 | VOUT | VIN−2*VOUT | VIN−VOUT |
| DP1 | 0.6 ≥ D1 ≥ 0.5 | 0.33 ≥ CR ≥ 0.25 | VOUT | VIN− | VIN− |

TABLE 1-continued

| mode | DI range | CR | V(CFLY1) | V(CFLY2) | V(CFLY3) |
|---|---|---|---|---|---|
| DP2 | $0.75 \geq D1 \geq 0.6$ | $0.5 \geq CR \geq 0.33$ | VOUT | 2*VOUT VOUT | VOUT VIN-VOUT |
| 3-LC | $1 \geq D1 \geq 0.5$ | $1 \geq CR \geq 0.5$ | VOUT | VIN-VOUT | VIN-VOUT |

It can be shown that the inductor current null (i.e., the quasi-resonant mode) occurs at a duty cycle of 50%. This corresponds to CR=0.25 for the hybrid dual path mode (i.e., DV or DP1) and CR=0.5 for the 3-LC mode. For both modes of operation, the inductor current ripple is lower than the ripple from a conventional 2-level buck converter.

Furthermore, it can be shown that the charge pump output 102 of the dual path topology supplies a significant portion of the total load current. This alleviates the current requirements for the inductor 105, especially around the middle range of duty cycles (around 50%).

Figure 4:
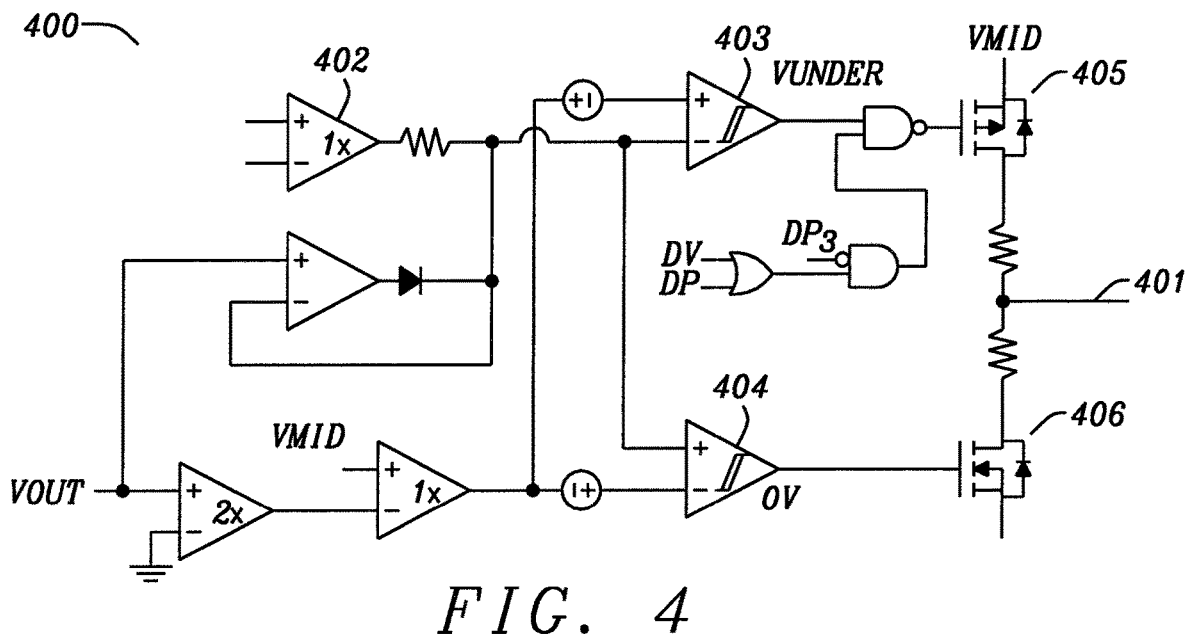
FIG. 4 shows an example voltage control circuit for controlling the voltage across the second flying capacitor.

FIG. 4 shows an example voltage control circuit 400 for controlling the voltage across the second flying capacitor CFLY2. The output port 401 of the circuit 400 is coupled to the node M2/M3 which is coupled to the second flying capacitor CFLY2. The circuit 400 may be used (e.g., only) during low CR operation (e.g., the DV, DP1 or DP2 modes), where the target voltage for CFLY2 is VIN−2*VOUT with a minimum limit of VOUT. A difference amplifier 402 senses the voltage across the second flying capacitor CFLY2. Over and under voltage (OV, UV) comparators 403, 404 monitor the output of the difference amplifier 402. If V(CFLY2) exceeds VIN−2*VOUT+$V_{TOLERANCE}$, the OV comparator 404 turns on an internal switch 406 connected in parallel with the second flying capacitor CFLY2. This removes excess charge from the second flying capacitor CFLY2. If V(CFLY2) falls below VIN−2*VOUT−$V_{TOLERANCE}$, the UV comparator 403 turns on a switch 405 connected between VMID (or VIN) and CFP2. This adds charge to the second flying capacitor CFLY2. The UV switch 405 is restricted to turn on only during a DV or DP event when the second flying capacitor CFLY2 is floated. In lieu of comparators, an ADC (Analog-to-Digital Converter) in conjunction with a digital controller may be used to determine when to turn on/off the CFLY2 charge maintenance switches 405, 406. Controlled current sources may be used in place of the switches 405, 406.

During high CR operation (i.e., 3-level converter mode), the CFLY2 voltage control is not needed and may be disabled. This is because the second flying capacitor CFLY2 is connected in parallel with the third flying capacitor CFLY3 during $D1_{3-LC}$. The third flying capacitor CFLY3 is connected between VIN and VOUT during $D2_{3-LC}$, DV and DP. This combination of switch states results in charge redistribution which ensures a second flying capacitor CFLY2 that is maintained at VIN−VOUT.

Figure 5:
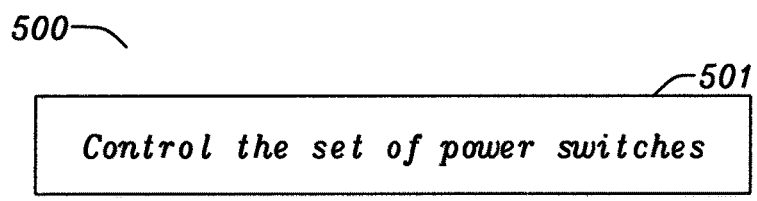
FIG. 5 shows a flow chart of an example method for operating a voltage regulator.

FIG. 5 shows a flow chart of an example method 500 for operating a power converter 100. The power converter 100 is configured to convert electrical power at an (DC) input voltage VIN at an input of the power converter 100 to electrical power at an (DC) output voltage VOUT at an output of the power converter 100.

The power converter 100 may comprise a first flying capacitor CFLY1, a second flying capacitor CFLY2 and a third flying capacitor CFLY3. Furthermore, the power converter 100 may comprise an inductor 105, and a set of power switches M1, M2, M3, M7, M10, M11, M8, M4, M5, M6.

The method 500 comprises controlling 501 the set of power switches M1, M2, M3, M7, M10, M11, M8, M4, M5, M6 such that during an operation cycle the power converter 100 is operated in a first state D1 and in a second state D2 in a mutually exclusive manner. The power converter 100 may be operated in a sequence of (identical) operation cycles. An operation cycle may have a fixed duration. The duty cycles of the first and/or second state D1, D2 within the different operations cycles may vary (e.g., in order to regulate the conversion ratio of the power converter 100 to a target conversion ratio, such as 0.25).

The set of power switches may be controlled such that within the first state D1, the power converter 100 exhibits a first current path 101 from ground through the second flying capacitor CFLY2, through the first flying capacitor CFLY1 and through the inductor 105 to the output (no other components (apart from closed power switches) may be located on the first current path 101). Furthermore, the set of power switches may be controlled such that within the first state D1, the power converter 100 exhibits a second current path 102 from the input through the third flying capacitor CFLY3 to the output (no other components (apart from closed power switches) may be located on the second current path 102). The different components may be located on the respective current path 101, 102 in the listed order.

The set of power switches may be controlled such that within the second state D2, the power converter 100 exhibits a first current path 101 from ground through the third flying capacitor CFLY3, through the second flying capacitor CFLY2 and through the inductor 105 to the output (no other components (apart from closed power switches) may be located on the first current path 101). Furthermore, the set of power switches may be controlled such that within the second state D2, the power converter 100 exhibits a second current path 102 from ground through the first flying capacitor CFLY1 to the output (no other components (apart from closed power switches) may be located on the second current path 102). The different components may be located on the respective current path 101, 102 in the listed order.

Hence, a (DC-DC) power converter 100, in particular a voltage regulator, configured to convert electrical power at an input voltage VIN at an input of the power converter 100 to electrical power at an output voltage VOUT at an output of the power converter 100 is described. The power converter 100 may comprise a first flying capacitor CFLY1, a second flying capacitor CFLY2 and a third flying capacitor CFLY3. Furthermore, the power converter 100 may comprise an inductor 105, and a set of power switches M1, M2, M3, M7, M10, M11, M8, M4, M5, M6 (e.g., field effect transistors, FETs).

The set of power switches M1, M2, M3, M7, M10, M11, M8, M4, M5, M6 may comprise a series of power switches which are arranged in series between the input voltage VIN and ground (GND). In particular, the set of power switches M1, M2, M3, M7, M10, M11, M8, M4, M5, M6 may comprise: a first power switch M1 with an input node (directly) coupled to the input (of the power converter 100)

and an output node (directly) coupled to a second power switch M2; the second power switch M2 with an input node (directly) coupled to the output node of the first power switch M1 and an output node (directly) coupled to a third power switch M3; the third power switch M3 with an input node (directly) coupled to the output node of the second power switch M2 and an output node (directly) coupled to a seventh power switch M7; the seventh power switch M7 with an input node (directly) coupled to the output node of the third power switch M3 and an output node (directly) coupled to a tenth power switch M10; the tenth power switch M10 with an input node (directly) coupled to the output node of the seventh power switch M7 and an output node (directly) coupled to an eleventh power switch M11; the eleventh power switch M11 with an input node (directly) coupled to the output node of the tenth power switch M10 and an output node (directly) coupled to an eighth power switch M8;

the eighth power switch M8 with an input node (directly) coupled to the output node of the eleventh power switch M11 and an output node (directly) coupled to a fourth power switch M4; the fourth power switch M4 with an input node (directly) coupled to the output node of the eighth power switch M8 and an output node (directly) coupled to a fifth power switch M5; the fifth power switch M5 with an input node (directly) coupled to the output node of the fourth power switch M4 and an output node (directly) coupled to a sixth power switch M6; and/or the sixth power switch M6 with an input node (directly) coupled to the output node of the fifth power switch M5 and an output node (directly) coupled to ground.

The inductor 105 may be arranged (directly) between the output node of the fourth switch M4 and the output of the power converter 100. Alternatively, or in addition, the first flying capacitor CFLY1 may be arranged (directly) between the output node of the third switch M3 and the output node of the eighth switch M8. Alternatively, or in addition, the second flying capacitor CFLY2 may be arranged (directly) between the output node of the second switch M2 and the output node of the fifth switch M5. Alternatively, or in addition, the third flying capacitor CFLY3 may be arranged (directly) between the output node of the first switch M1 and the output node of the tenth switch M10.

Furthermore, the power converter 100 may comprise a nineth power switch M9 with an input node (directly) coupled to the output node of the first power switch M1 and an output node (directly) coupled to the input node of the fifth power switch M5.

The power converter 100 comprises a control unit 120 which is configured to control the set of power switches M1, M2, M3, M7, M10, M11, M8, M4, M5, M6 such that during an operation cycle the power converter 100 is operated in a first state D1 and in a second state D2 in a mutually exclusive manner. In particular, the control unit 120 may be configured to control the set of power switches M1, M2, M3, M7, M10, M11, M8, M4, M5, M6 during a sequence of subsequent operation cycles, wherein each operation cycle comprises a (exactly one) first state D1 and a (exactly one) second state D2.

Alternatively, or in addition, the control unit 120 may be configured to control the set of power switches M1, M2, M3, M7, M10, M11, M8, M4, M5, M6 such that the first state and the second state are repeated in an alternating manner, and/or such that the duty cycle and/or the duration of the first state D1 is equal to the duty cycle and/or the duration of the second state D2.

The repeated operation of the power converter 100 in different states may be used to regulate the output voltage VOUT to a target voltage and/or to regulate the conversion ratio to a target conversion ratio. In particular, the control unit 120 may be configured to regulate the output voltage VOUT to one fourth of the input voltage VIN. Alternatively, or in addition, the control unit 120 may be configured to set, in particular to regulate, the target conversion ratio between the input voltage VIN and the output voltage VOUT, in particular to a target conversion ratio of 0.25. In particular, the control unit 120 may be configured to adjust the duty cycle of the first state and of the second state to modify the conversion ratio between the input voltage VIN and the output voltage VOUT.

The power converter 100 exhibits within the first state D1 a first current path 101 from ground through the second flying capacitor CFLY2, through the first flying capacitor CFLY1 and through the inductor 105 to the output.

In the present document, the current may flow through a current path 101, 102 in the direction indicated by the order of the different components on the respective current path 101, 102. Furthermore, there may be no other components on a current path 101, 102 (apart from the listed ones and apart from closed power switches M1, M2, M3, M7, M10, M11, M8, M4, M5, M6, M9, M12).

Furthermore, the power converter 100 exhibits within the first state D1 a second current path 102 from the input through the third flying capacitor CFLY3 to the output.

The control unit 120 may be configured to cause the first power switch M1, the third power switch M3, the tenth power switch M10, the fourth power switch M4 and the sixth power switch M6 to be closed; and to cause the second power switch M2, the seventh power switch M7, the eleventh power switch M11, the eighth power switch M8 and the fifth power switch M5 to be open, for putting the power converter 100 in the first state D1.

On the other hand, the power converter 100 may exhibit within the second state D2 a first current path 101 from ground through the third flying capacitor CFLY3, through the second flying capacitor CFLY2 and through the inductor 105 to the output. Furthermore, the power converter 100 may exhibit within the second state D2 a second current path 102 from ground through the first flying capacitor CFLY1 to the output.

The control unit 120 may be configured to cause the first power switch M1, the third power switch M3, the tenth power switch M10, the fourth power switch M4 and/or the sixth power switch M6 to be open; and to cause the second power switch M2, the seventh power switch M7, the eleventh power switch M11, the eighth power switch M8 and/or the fifth power switch M5 to be closed, for putting the power converter 100 in the second state D2.

The first state D1 may be such that the inductor 105 is magnetized, the second flying capacitor CFLY2 is discharged, the first flying capacitor CFLY1 is charged and/or the third flying capacitor CFLY3 is charged. The second state D2 may be such that the inductor 105 remains neutral, the second flying capacitor CFLY2 is charged, the first flying capacitor CFLY1 is discharged and/or the third flying capacitor CFLY3 is discharged.

It can be shown that the power converter 100 can be operated in a particularly efficient manner with a conversion ratio of 0.25.

The control unit 120 may be configured to control the set of power switches M1, M2, M3, M7, M10, M11, M8, M4, M5, M6 such that during an (in particular during each) operation cycle the power converter 100 is operated in a first intermediate state DV, which in particular lies in between the first state D1 and the second state D2 and/or in between the second state D2 and the first state D1. As such, the power converter 100 may be operated repeatedly in the states D1, DV, D2, DV. In other words, an operation cycle may (exactly) comprise the D1, DV, D2, DV.

The power converter 100 may exhibit within the first intermediate state DV a first current path 101 from ground through the inductor 105 to the output, and/or a second current path 102 from the input through the third flying capacitor CFLY3 to the output, and from ground through the first flying capacitor CFLY1 to the output. The power switches may be controlled as outlined in the context of FIG. 2c. By making use of a first intermediate state, the conversion ratio may be regulated to a target conversion ratio in a particularly precise and robust manner.

Alternatively, or in addition, the control unit 120 may be configured to control the set of power switches M1, M2, M3, M7, M10, M11, M8, M4, M5, M6 such that during an (in particular during each) operation cycle the power converter 100 is operated in a second intermediate state DP, which in particular lies in between the first state D1 and the second state D2 and/or in between the second state D2 and the first state D1. As such, the power converter 100 may be operated repeatedly in the states D1, DP, D2, DP. In other words, an operation cycle may (exactly) comprise the D1, DP, D2, DP.

The power converter 100 may exhibit within the second intermediate state DP a first current path 101 from input through the inductor 105 to the output, and/or a second current path 102 from the input through the third flying capacitor CFLY3 to the output, and from ground through the first flying capacitor CFLY1 to the output. The power switches may be controlled as outlined in the context of FIG. 2d. By making use of a second intermediate state, the conversion ratio may be regulated to a target conversion ratio in a particularly precise and robust manner.

The power converter 100 may comprise a voltage control circuit 400 which is configured to set the voltage across the second flying capacitor CFLY2 to a target voltage. The target voltage may be the input voltage VIN minus two times the output voltage VOUT. By making use of a voltage control circuit 400 the precision and robustness of the power converter 100 can be further increased.

The control unit 120 may be configured to determine whether the target conversion ratio between the input voltage VIN and the output voltage VOUT is equal to or smaller than 0.5, or greater than 0.5. The power converter 100 may be operated alternately in the first state D1 and in the second state D2, if the target conversion ratio is equal to or smaller than 0.5.

On the other hand, the power converter 100 may be operated alternately in a modified first state $D1_{3LC}$ (as outlined in the context of FIG. 3a) and in a modified second state $D2_{3LC}$ (as outlined in the context of Fig. b), if the target conversion ratio is greater than 0.5. The power converter 100 may exhibit within the modified first state $D1_{3LC}$ a first current path 101 from ground through the second flying capacitor CFLY2 and through the inductor 105 to the output, and/or a second current path 102 from ground through the first flying capacitor CFLY1 to the output. Furthermore, the power converter 100 may exhibit within the modified second state $D2_{3LC}$ a first current path 101 from the input through the second flying capacitor CFLY2 and through the inductor 105 to the output, and/or a second current path 102 from the input through the third flying capacitor CFLY3 to the output, and from ground through the first flying capacitor CFLY1 to the output. As a result of this, an efficient power conversion at relatively high conversion ratios is enabled.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert electrical power at an input voltage at an input of the power converter to electrical power at an output voltage at an output of the power converter; wherein the power converter comprises,
    a first flying capacitor, a second flying capacitor and a third flying capacitor;
    an inductor;
    a set of power switches; and
    a control unit configured to control the set of power switches such that during an operation cycle the power converter is operated in a first state and in a second state in a mutually exclusive manner;
    wherein within the first state, the power converter exhibits
        a first current from ground through the second flying capacitor, through the first flying capacitor and through the Inductor to the output; and
        a second current from the input through the third flying capacitor to the output; and
    wherein within the second state, the power converter exhibits
        a first current from ground through the third flying capacitor, through the second flying capacitor and through the inductor to the output; and
        a second current from ground through the first flying capacitor to the output.

2. The power converter of claim 1, wherein
    the control unit is configured to control the set of power switches during a sequence of subsequent operation cycles; and
    each operation cycle comprises a first state and a second state.

3. The power converter of claim 1, wherein the control unit is configured to control the set of power switches such that
    the first state and the second state are repeated in an alternating manner; and/or
    a duty cycle and/or duration of the first state Is equal to a duty cycle and/or duration of the second state.

4. The power converter of claim 1, wherein
    the control unit is configured to control the set of power switches such that during an operation cycle the power converter is operated in a first Intermediate state, which in particular lies in between the first state and the second state and/or in between the second state and the first state; and
    within the first intermediate state, the power converter exhibits
        a first current from ground through the inductor to the output; and a second current from the input through the third flying capacitor to the output, and from ground through the first flying capacitor to the output.

5. The power converter of claim 1, wherein
the control unit (120) is configured to control the set of power switches such that during an operation cycle the power converter is operated in a second intermediate state, which in particular lies in between the first state and the second state and/or in between the second state and the first state; and
within the second intermediate state, the power converter exhibits
a first current from Input through the inductor to the output; and
a second current from the input through the third flying capacitor to the output, and from ground through the first flying capacitor to the output.

6. The power converter of claim 1, wherein the set of power switches comprises a series of power switches which are arranged in series between the input voltage and ground.

7. The power converter of claim 1, wherein the set of power switches comprises
a first power switch with an input node coupled to the input and an output node coupled to a second power switch;
the second power switch with an input node coupled to the output node of the first power switch and an output node coupled to a third power switch;
the third power switch with an input node coupled to the output node of the second power switch and an output node coupled to a seventh power switch;
the seventh power switch with an input node coupled to the output node of the third power switch and an output node coupled to a tenth power switch;
the tenth power switch with an input node coupled to the output node of the seventh power switch and an output node coupled to an eleventh power switch;
the eleventh power switch with an input node coupled to the output node of the tenth power switch and an output node coupled to an eighth power switch;
the eighth power switch with an input node coupled to the output node of the eleventh power switch and an output node coupled to a fourth power switch;
the fourth power switch with an input node coupled to the output node of the eighth power switch and an output node coupled to a fifth power switch;
the fifth power switch with an input node coupled to the output node of the fourth power switch and an output node coupled to a sixth power switch; and
the sixth power switch with an input node coupled to the output node of the fifth power switch and an output node coupled to ground.

8. The power converter of claim 7, wherein,
the Inductor is arranged between the output node of the fourth switch and the output of the power converter; and/or
the first flying capacitor is arranged between the output node of the third switch and the output node of the eighth switch; and/or
the second flying capacitor is arranged between the output node of the second switch and the output node of the fifth switch; and/or
the third flying capacitor is arranged between the output node of the first switch and the output node of the tenth switch.

9. The power converter of claim 7, wherein the control unit Is configured to cause the first power switch, the third power switch, the tenth power switch, the fourth power switch and the sixth power switch to be closed; and to cause the second power switch, the seventh power switch, the eleventh power switch, the eighth power switch and the fifth power switch to be open, for putting the power converter in the first state; and/or
to cause the first power switch, the third power switch, the tenth power switch, the fourth power switch and the sixth power switch to be open; and to cause the second power switch, the seventh power switch, the eleventh power switch, the eighth power switch and the fifth power switch to be closed, for putting the power converter in the second state.

10. The power converter of claim 7, wherein the power converter comprises a ninth power switch with an input node coupled to the output node of the first power switch and an output node coupled to the input node of the fifth power switch.

11. The power converter of claim 1, wherein
the first state is such that the inductor is magnetized, the second flying capacitor is discharged, the first flying capacitor is charged and/or the third flying capacitor is charged; and/or
the second state Is such that the inductor remains neutral, the second flying capacitor is charged, the first flying capacitor is discharged and/or the third flying capacitor is discharged.

12. The power converter of claim 1, wherein
the power converter comprises a voltage control circuit configured to set a voltage across the second flying capacitor to a target voltage; and
in particular the target voltage is the input voltage minus two times the output voltage.

13. The power converter of claim 1, wherein the control unit is configured to
regulate the output voltage to one fourth of the input voltage; and/or
set a target conversion ratio between the input voltage and the output voltage, in particular a target conversion ratio of 0.25; and/or
adjust a duty cycle of the first state and of the second state to modify a conversion ratio between the input voltage and the output voltage.

14. The power converter of claim 1, wherein the control unit is configured to
determine whether a target conversion ratio between the input voltage and the output voltage is equal to or smaller than 0.5, or greater than 0.5;
operate the power converter alternately in the first state and in the second state, if the target conversion ratio is equal to or smaller than 0.5; and
operate the power converter alternately in a modified first state and in a modified second state, if the target conversion ratio is greater than 0.5;
wherein within the modified first state, the power converter exhibits
a first current from ground through the second flying capacitor and through the inductor to the output; and
a second current from ground through the first flying capacitor to the output; and
wherein within the modified second state, the power converter exhibits
a first current from the input through the second flying capacitor and through the inductor to the output; and a second current from the input through the third flying capacitor to the output, and from ground through the first flying capacitor to the output.

15. A method for operating a power converter which is configured to convert electrical power at an input voltage at an input of the power converter to electrical power at an output voltage at an output of the power converter;
   wherein the power converter comprises,
      a first flying capacitor, a second flying capacitor and a third flying capacitor;
      an inductor,
      a set of power switches; and
   wherein the method comprises controlling the set of power switches such that during an operation cycle the power converter is operated in a first state and in a second state in a mutually exclusive manner;
   wherein within the first state, the power converter exhibits
      a first current from ground through the second flying capacitor, through the first flying capacitor and through the inductor to the output; and
      a second current from the input through the third flying capacitor to the output; and
   wherein within the second state, the power converter exhibits
      a first current from ground through the third flying capacitor, through the second flying capacitor and through the inductor to the output; and
a second current from ground through the first flying capacitor to the output.

* * * * *